July 12, 1938.    C. L. CLARK    2,123,714
SKID PLATFORM
Filed Feb. 18, 1937
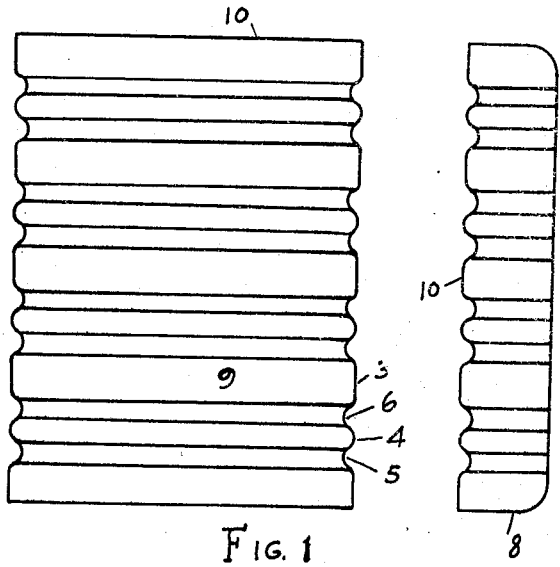
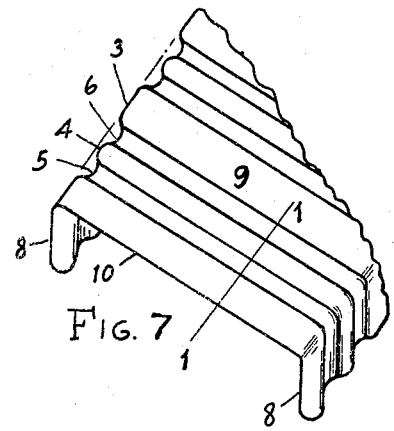
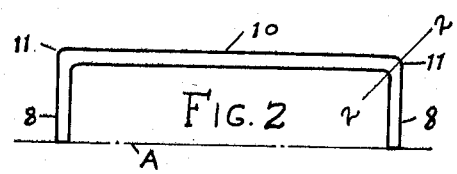
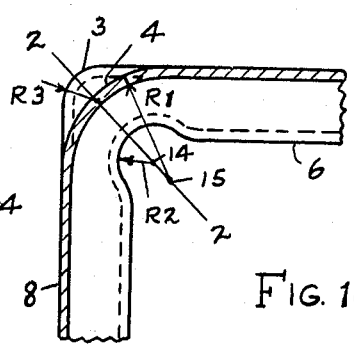
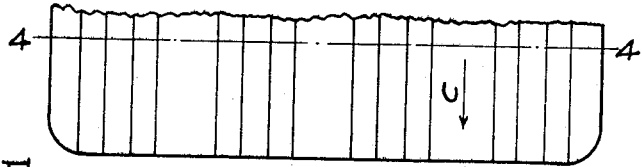
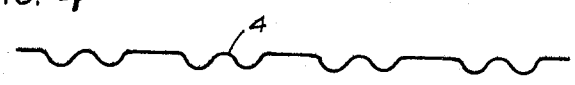
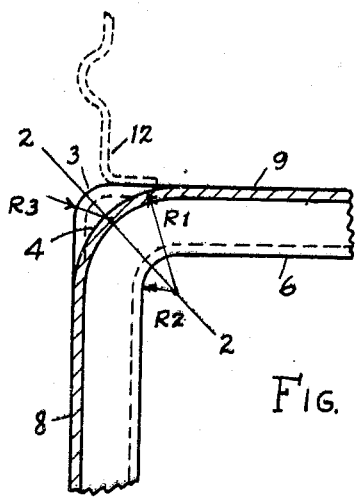
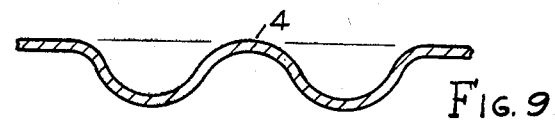
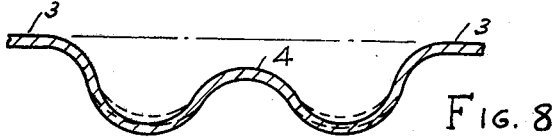
INVENTOR.
Carl L. Clark
BY
ATTORNEYS.

Patented July 12, 1938

2,123,714

UNITED STATES PATENT OFFICE 2,123,714

SKID PLATFORM

Carl L. Clark, Warren, Ohio

Application February 18, 1937, Serial No. 126,420

3 Claims. (Cl. 248—120)

The invention relates to material handling platforms commonly called skid platforms, which are used either directly or combined with boxes, stakes, casters, crane hooks, rings, runners, and the like, for storing, handling and transporting parts, both large and small, and heavy or light, in a manufacturing plant.

More particularly, the invention relates to a skid platform made from a single blank of sheet or plate metal, preferably steel, and formed integrally with longitudinally extending legs and spaced stiffening corrugations extending transversely of the platform deck and legs.

A skid platform is usually transported or handled either by a hand or a power operated lift truck, the lifting platform of which is passed underneath the skid platform deck between the legs thereof, and is elevated or lowered for transporting or locating the platform and load carried thereby.

The strength or stiffness of such a skid platform is dependent upon the number and shape of the stiffening corrugations; and these corrugations must run around the corners between the legs and deck so as to provide stiffness and strength at such corners in order to prevent spreading or collapse of the legs when a loaded platform is being handled.

In prior types of skid platforms, failures frequently occur at the corners, particularly at the corner bends in the corrugations, because these corrugation corner bends are not strong enough to withstand, while a skid platform is loaded, the extreme shock to which they may be subjected when the lifting platform of a lifting truck strikes the platform leg with a glancing blow, as the truck lifting platform is entered beneath the skid platform to pick up the skid platform.

A glancing blow of this type frequently bends the leg outward under such severe shock conditions that the metal at the corner bends in the skid platform corrugations, cracks or ruptures and the skid platform eventually fails by flattening out.

Accordingly, it is a principal object of the present invention to materially increase the strength of a corrugated sheet or plate metal skid platform at the corners between the platform legs and deck, and particularly at the corner bends in the corrugations thereof.

A further object of the present invention is to provide an improved type of corrugation arrangement so shaped at the corners that severe shock loads will be withstood without failure.

In prior types of skid platforms the metal at the corner bends in the corrugations has been usually excessively work hardened when the corners are formed between the platform deck and legs. This work hardening develops brittleness that reduces the ability of such platforms to withstand the shock of a glancing blow; with the result that the brittle areas crack, fracture or rupture, after a slight bending caused by a glancing blow. In other types, where the metal in the corners has not been excessively work hardened, the shape of the corrugations in the corners has been such that the corners lack sufficient strength to withstand severe loads, with the result that the legs are bent out of normal position and failure results.

Accordingly, it is a further object of the present invention to provide an improved corrugation consisting of relatively shallow recessed corrugations with relatively narrow raised center ribs therebetween with contours so shaped, at the corner bends in the corrugations and center rib of a corrugated sheet metal skid platform, that a minimum amount of work hardening occurs at and adjacent to the corner bends in the corrugations and center ribs; so that the metal thereat retains considerable resilience and therefore ability to withstand severe shock loads without damage or failure.

Moreover, it is an additional object of the present invention to provide an improved corner construction of a corrugated sheet metal skid platform which retains strength and stiffness even though the legs may be excessively bent from a normal location; as a result of a sidewise shock blow, without causing a rupture or failure of the metal at the corner.

Finally, it is an object of the present invention to provide a corrugated sheet metal skid platform with the advantageous features, characteristics and construction described, in a simple and inexpensive manner.

These and other objects may be obtained by the improved construction, a preferred embodiment of which is shown in the accompanying drawing, and is hereafter described in detail and claimed, which may be stated in general terms as including in a sheet metal skid platform construction, a generally horizontally deposed deck, longitudinally extending, substantially vertically disposed, continuous legs formed integrally at each side of the deck with a corner between each leg and the deck; spaced groups of corrugations transversing the deck, legs and corners; each group consisting of a pair of depressed relatively shallow corrugations with a relatively narrow raised stiffening center rib between each pair of corrugations; each group of corrugations and center rib at the corner bends joining and blending into the corrugations in the deck and legs in a gradual curve while the corner bends between these groups join the deck and legs in a short abrupt curve.

In the drawing,

Fig. 1 is a plan view of a corrugated sheet metal skid platform having the improved corner construction;

Fig. 2 is an end elevation of the platform shown in Fig. 1;

Fig. 3 is a side elevation of the platform shown in Figs. 1 and 2;

Fig. 4 is a plan view of a portion of a sheet metal blank from which the improved skid platform is made, spaced groups of pairs of recessed corrugations with raised relatively narrow center rib having been formed therein;

Fig. 5 is an end elevation of the corrugated blank shown in Fig. 4;

Fig. 6 is an enlarged fragmentary sectional view thru a center rib, showing one corner of a skid platform having the improved corner construction;

Fig. 7 is a perspective view of a portion of a skid platform showing the improved corner construction and the grouping of the pairs of corrugations and center rib;

Fig. 8 is a fragmentary sectional view taken on the line 2—2 Figs. 2, 6, and 10, the dash lines showing the modification in contour in Fig. 10;

Fig. 9 is a fragmentary section taken on the line 1—1 Fig. 7;

Fig. 10 is an enlarged fragmentary sectional view thru a center rib showing one corner of a skid platform having the improved corner construction as shown in Fig. 6 but modified as to contour of the double corrugations.

Similar numerals refer to similar parts throughout the various figures in the drawing.

A sheet metal skid platform is generally indicated at 10 in Figs. 1, 2, 3, and 7 and includes a horizontally deposed deck generally indicated at 9 and legs generally indicated at 8 formed integrally with the deck. The deck 9 is preferably generally rectangular in outline and is spaced from the floor or the like A by the legs 8 which extend preferably longitudinally of the deck 9 in a generally vertical position and are preferably continuous at the marginal side edges of deck 9, as shown, thereby forming corners generally indicated at 11 (Fig. 2) between each leg 8 and the deck 9.

A series of spaced, pairs of recessed corrugations 5 and 6 and raised narrow center rib 4 traverse the deck 9 in a crosswise manner and extend around the corners 11 and downward in each leg 8. The corrugations 5 and 6 and the center rib 4 are shown as approximately half round in cross section, but it is understood that the particular shape is not essential, as they may be somewhat trapezoidal-channeled, U shaped, V shaped, or other shape if desired.

It is to be particularly noted by referring to Figs. 1, 3, and 7, that the double corrugations 5 and 6 and center rib 4 extend around the corners 11 as well as across the deck 9 and down the legs 8; and are of uniform contour and depth throughout their length except in the corners 11 as shown in Figs. 6 and 10. Further, the radius R1 of the center rib 4 is substantially greater than radius R3 of the corner 11 at 3. This relation serves two purposes: one is to keep the outside corner radius R3 as small as possible (about one-half inch or less) in order that the flat portion of deck 9 will be as wide as possible; thereby providing better support for the lower side flange of a corrugated box resting thereon and indicated by 12 in Fig. 6; the other is to maintain the radius R1 substantially greater than R3 in order that the upsetting action, caused by the corner bending operation, be distributed over a greater length of corrugations 5 and 6 and center rib 4 at corners 11 thereby preventing severe work hardening of the metal in the corrugations at the corners and localized upsetting and buckling in said corrugations which would destroy the resiliency of the metal therein and consequently materially lessen the strength of corners 11.

In Fig. 6 the radii R1 and R2 indicate the contour of the center rib 4 and the bottom portion of corrugations 5 and 6 respectively around corners 11 in which said radii have a common center 13. This is the preferred relationship of said radii but the upsetting action, caused by the bending of corners 11 to form legs 8, tends to cause the center of radius R2 to take a position as at 14 while the center of radius R1 is at 15 as shown in Fig. 10.

It is to be understood that the contours indicated by radii R1 and R2 at corners 11 will not necessarily lie within the arcs described by said radii as the upsetting and stretching action set up during the forming of said corners 11 will deflect said contours out of the paths of said arcs and that radii R1 and R2 are used only to show the general and approximate outline of said contours.

It is to be further understood that the contour of the double corrugations 5 and 6 in deck 9 and legs 8 need not be of uniform section throughout the length thereof to lie within the scope of this invention as they may, for instance, be deeper or shallower, wider or narrower throughout a portion of their length, or of contours different from those shown, but conditions incident to the manufacture of corrugated skid platforms of various widths render uniform sections in deck 9 and legs 8 preferable.

It is to be further understood that the scope of the invention is not limited to the particular shapes and contours shown, but changes can be made in such contours without departing from the invention disclosed.

Moreover, with the improved construction, even though portions of the leg 8 may be severely bent outwardly due to a glancing blow, the legs will still support a load because the corner constructions do not fail or break, even with excessive bending, as compared with prior types of skid platform corner constructions wherein breakage occurs after only a slight bending, due to brittleness incident to excessive work hardening.

I have likewise discovered that when the grain of the metal in the sheet steel blank 16 runs parallel with the direction of the corrugations 5 and 6, as indicated by arrow C in Fig. 2, the strength of the skid platform corners is increased more than ten percent.

Further, it is to be understood that it is within the scope of the present invention: that the corrugations in the deck and legs of the skid platform be a series of single recessed corrugations, with double corrugations running around the corners in a gradual curve and joining and merging in the deck and leg corrugations, while the portions of the corners between successive double corrugations join the deck and legs in a short abrupt curve, each said double corrugation consisting of two recessed corrugations with a raised center rib or corrugation therebetween; that the corrugations in the deck be a series of single recessed corrugations and the corrugations in the legs be a series of double corrugations each consisting of two recessed corrugations with a raised center rib therebetween, or the reverse, and double corrugations in the corners each consisting of two recessed corrugations with a raised center rib therebetween, running around the corners in a gradual curve, while the portions of the corners between said double corrugations in the corners join the deck and legs in a short abrupt curve.

It is further to be understood that it is within the scope of the present invention that the corrugations in the deck, legs and corners be a series of corrugations comprising recessed corrugations and raised rib corrugations, the word raised meaning that the top of the rib corrugation extends above the bottom portion of the recessed corrugation toward or above, for instance, the surface as indicated by the flat portion of the skid platform, 9, in Fig. 7, the corrugations running around the corners in a gradual curve while the portions of the corners between successive corrugations join the deck and legs in a short abrupt curve.

Having now described the features of the invention and the advantages and results obtained thereby; the new and useful parts, elements, devices, combinations and constructions, and reasonable mechanical equivalents thereof obvious to those skilled in the art, are set forth in the appended claims.

What I claim is as follows:

1. In a sheet metal skid platform having a deck and marginal upright legs with corners therebetween formed integrally from a single metal blank, a series of double corrugations, consisting of two recessed corrugations joined together by a raised center rib therebetween, traversing the deck, corners and legs thereof; the portions of the corners between and adjacent to successive double corrugations joining the deck and legs in a short abrupt curve, and the raised center ribs joining the deck and leg corrugations in a longer more gradual curve.

2. In a sheet metal skid platform having a deck and marginal upright legs with corners therebetween formed integrally from a single metal blank, a double corrugation, consisting of two recessed corrugations joined together with a raised center rib therebetween, running around each corner, joining and merging into the deck and each leg corrugation, the portion of each corner not defined within a double corrugation joining the deck and each leg in a short abrupt curve and the raised center rib in each corner joining the deck and a leg corrugation in a longer more gradual curve and merging thereinto.

3. In a sheet metal skid platform having a deck and marginal upright legs with corners therebetween formed integrally from a single metal blank, a double corrugation, consisting of two recessed corrugations joined together by a raised center rib therebetween, traversing the deck, corners and legs thereof; the portion of each corner not defined within the double corrugation joining the deck and a leg in a short abrupt curve and the raised center rib in each corner joining a corrugation in the deck and a corrugation in a leg in a longer more gradual curve, and the grain of the metal in the sheet blank running parallel with said deck traversing corrugation.

CARL L. CLARK.